US012776299B1

(12) United States Patent
Chong et al.

(10) Patent No.: US 12,776,299 B1
(45) Date of Patent: Oct. 27, 2026

(54) ENHANCED ACCENT CONVERSION FOR VIRTUAL CONFERENCING AND AUDIO RECORDINGS

(71) Applicant: Zoom Video Communications, Inc., San Jose, CA (US)

(72) Inventors: Dading Chong, Hangzhou (CN); Dongyang Dai, Hangzhou (CN); Yuzong Liu, Bothell, WA (US); Chao Wang, Hangzhou (CN); Tao Wang, Hangzhou (CN); Shenquan Zhang, Hangzhou (CN)

(73) Assignee: Zoom Communications, Inc., San Jose, CA (US)

( * ) Notice: Subject to any disclaimer, the term of this patent is extended or adjusted under 35 U.S.C. 154(b) by 176 days.

(21) Appl. No.: 18/650,978

(22) Filed: Apr. 30, 2024

(51) Int. Cl.

| | |
|---|---|
| ***G10L 13/027*** | (2013.01) |
| ***G10L 13/033*** | (2013.01) |
| ***G10L 13/08*** | (2013.01) |
| ***G10L 15/02*** | (2006.01) |
| ***G10L 15/06*** | (2013.01) |
| ***G10L 15/16*** | (2006.01) |

(52) U.S. Cl.
CPC .......... *G10L 13/027* (2013.01); *G10L 13/033* (2013.01); *G10L 13/08* (2013.01); *G10L 15/02* (2013.01); *G10L 15/063* (2013.01); *G10L 15/16* (2013.01)

(58) Field of Classification Search
CPC ..... G10L 13/027; G10L 13/033; G10L 13/08; G10L 15/02; G10L 15/063; G10L 15/16
See application file for complete search history.

(56) References Cited

U.S. PATENT DOCUMENTS

| | | | | |
|---|---|---|---|---|
| 2022/0358903 | A1* | 11/2022 | Serebryakov | G06N 20/20 |
| 2024/0029715 | A1* | 1/2024 | Rosenberg | G10L 15/16 |
| 2024/0161764 | A1* | 5/2024 | Maikhuri | G10L 21/007 |
| 2024/0355346 | A1* | 10/2024 | Lubin | G10L 17/02 |

(Continued)

FOREIGN PATENT DOCUMENTS

| | | | | |
|---|---|---|---|---|
| CN | 114141237 A | * | 3/2022 | G10L 15/16 |

OTHER PUBLICATIONS

Mu, Z., Yang, X., Sun, S., & Yang, Q. (Mar. 2024). Self-supervised disentangled representation learning for robust target speech extraction. In Proceedings of the AAAI Conference on Artificial Intelligence (vol. 38, No. 17, pp. 18815-18823). (Year: 2024).*

(Continued)

*Primary Examiner* — Philip H Lam
(74) *Attorney, Agent, or Firm* — Kilpatrick Townsend & Stockton LLP

(57) ABSTRACT

Example methods and systems for enhanced accent conversion are provided. In an example method, an audio input is accessed and a first set of features is extracted from the audio input using a first neural network. A second set of features is further determined based on the first set of features using a second neural network. The second neural network is configured to extract features that are accent-neutral. The second set of features is then transformed into output audio data using a decode based on a designated accent identifier. The example method provides an enhanced accent conversion for video conferencing and audio recording.

14 Claims, 8 Drawing Sheets

(56) References Cited

U.S. PATENT DOCUMENTS

2025/0118286 A1 * 4/2025 Badlani ................. G10L 13/047

OTHER PUBLICATIONS

Liu, R., Sisman, B., Gao, G., & Li, H. (2024). Controllable accented text-to-speech synthesis with fine and coarse-grained intensity rendering. IEEE/ACM Transactions on Audio, Speech, and Language Processing, 32, 2188-2201. (Year: 2024).*

Nguyen, T. N., Pham, N. Q., & Waibel, A. (2022). Accent Conversion using Pre-trained Model and Synthesized Data from Voice Conversion. In Interspeech (pp. 2583-2587). (Year: 2022).*

* cited by examiner

ENHANCED ACCENT CONVERSION FOR VIRTUAL CONFERENCING AND AUDIO RECORDINGS

FIELD

The present application generally relates to accent conversion, and more specifically, relates to enhanced accent conversion for virtual conferencing and audio recordings.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
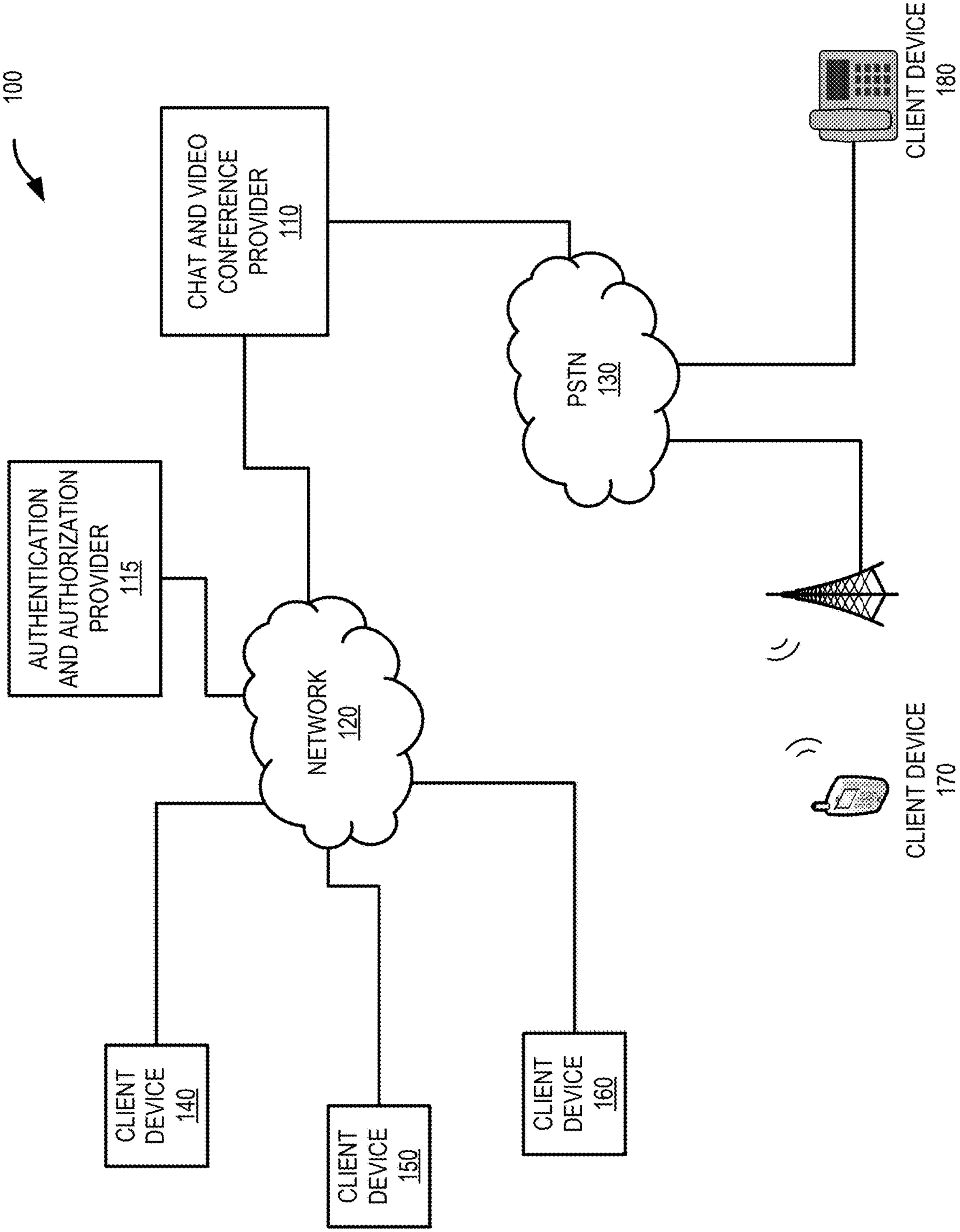
FIG. 1 shows an example system that provides videoconferencing and chat functionality to various client devices.

Examples are described herein in the context of enhanced accent conversion for virtual conferencing and audio recordings. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Oral communication is crucial for effective daily interaction and plays a significant role in various aspects of life, including personal relationships, health care, business, education, and other everyday interactions. Accents can influence the pronunciation and comprehension of words, particularly in digital interactions. Therefore, it is crucial to integrate reliable speech recognition and accent conversion techniques in digital communication to ensure clarity and understanding across diverse linguistic backgrounds.

The accent conversion process typically begins by extracting accent-neutral content information from the speech. This information is then transformed using an accent conversion model into acoustic features that reflect the target accent. These features are finally converted into a synthesized speech signal. Two primary approaches have been used to extract accent-neutral content information: one approach involves using an automatic speech recognition (ASR) encoder to extract phonetic posteriorgrams (PPGs) as content features, and the other approach relies on self-supervised pretrained speech models, like Hubert and similar models, for content feature extraction.

However, the conventional approaches either heavily depend on the capabilities of the underlying ASR system or overly focus on modeling pronunciation units, making them less effective in separating speech content from accent-related information. Additionally, these traditional accent conversion systems often struggle to preserve the natural flow and clarity of the converted speech, leading to suboptimal outcomes.

It is thus desirable to provide techniques to for enhanced accent conversion to preserve the natural flow and clarity of the converted speech and ensure a high level of intelligibility and authenticity of the speech conversion. An example accent conversion technique utilizes an encoder that is pretrained to align text features to content features using dynamic programming techniques, so that an optimal result of extracting accent-neutral features from the content features can be achieved, thereby improving the performance of synthesizing audio signals of the target accent.

The example accent conversion techniques disclosed herein include an enhanced accent conversion system and associated training framework. In an example enhanced accent conversion system, an audio input data with a first accent from an original speaker can be processed to generate an output audio with a desired accent. The output audio may simulate audio features such as pitch, prosody, and timbre of the original speaker. The enhanced accent conversion system can be applied to a video conferencing and/or an audio recording scenario.

One example enhanced accent conversion system may have various modules, each capable of performing distinct tasks to achieve enhanced accent conversion. For example, the enhanced accent conversion system may have an audio preprocessing module that converts audio files into a spectrogram. An audio input file may be loaded to the audio preprocessing module. The audio input file may contain time-domain audio signals. The audio preprocessing module may divide the time-domain audio signals into short overlapping segments (i.e., frames) and transform each frame into a frequency-domain representation, e.g., using a Fourier transformation. The frequency-domain representations may be provided and output by the audio preprocessing module as audio data (e.g., in the frequency domain). In a visualization of an example spectrogram, an x-axis represents time, a y-axis represents frequency, and a color intensity represents a magnitude of the frequency components. Thus, the spectrogram indicates the represented frequencies in the audio data and their respective magnitudes. The spectrograms may provide a detailed description of the audio signal's frequency content for analyzing and processing audio data. The audio preprocessing module may also extract features such as Mel-frequency cepstral coefficients (MFCCs) from the spectrograms. It should be understood that different techniques may be used to preprocess the audio input files.

The example enhanced accent conversion system may have a content extractor module that extract content features from the audio input data or the audio data output by the audio preprocessing module. The content extractor module may utilize a machine learning model or a neural network (e.g., a transformer model). For example, the content extractor module may use an encoder portion of an automatic speech recognition (ASR) model to extract content features from the audio data. In some examples, the encoder portion is a pretrained Bidirectional Encoder Representations from Transformers (BERT) model or a Hidden-Unit BERT (HuBERT) model. In some examples, the content extractor module utilizes Hidden Markov Models (HMMs) to extract content features. In some examples, the content extractor module utilizes a hybrid model that is a combination of different types of encoders, such as a combination of Convolutional Neural Networks (CNNs) and Recurrent Neural Networks (RNNs), to capture both local and long-range dependencies in the input audio data to generate content features.

As mentioned previously, the content features extracted using the conventional techniques have associated problems and may result in an inaccurate conversion of audio input with the first accent. For example, the traditional ASR models are generally trained on standard or neutral accents and may struggle to accurately convert speech from speakers with different accents. This is because accents can introduce variations in pronunciation, vocabulary, and speech patterns that are not present in the training data. To fine-tune a trained ASR model may also be challenging, especially if the input accent is significantly different from the ones the model was trained on.

To address the problems and challenges associated with the conventional ASR models, the enhanced accent conversion techniques disclosed herein introduce a feature encoder to generate or extract accent-neutral features from the content features provided by an encoder portion of an ASR model. In an example enhanced accent conversion system, a feature encoder module is included to perform the task of generating or extracting accent-neutral features from the content features provided by the content extractor module. The feature encoder module may comprise a pretrained encoder that is configured to extract accent-neutral features from the content features using a text-based approach.

An example encoder of the feature encoder module may be pretrained using training framework disclosed herein. For example, the encoder may be trained using a set of training data comprising paired-up content features extracted from input audio and associated text information corresponding to the original speech of the input audio. The encoder may generate accent-neutral features using language-based models and/or neural networks. To ensure that the generated features are effectively accent-neutral, a supervised approach may be introduced and deployed using dynamic programming. In some examples, the text information is encoded using a text encoder to generate text features. By employing the dynamic programming, the text features may be aligned with the generated accent-neutral features to calculate a text loss. The alignment process can provide information about a pronunciation duration for each phoneme of the speech of the input audio. In some examples, the text features may be upsampled before calculating the text loss. The upsampling may be performed based on a total number of the corresponding generated accent-neutral features. The encoder may be further optimized based on the alignment and the text loss.

The example enhanced accent conversion system may have a decoder module that converts the accent-neutral features that are representative of the audio data into a sequence of words or phonemes. The decoder module may comprise a decoder portion of an ASR model. The decoder module may be also configured to receive additional information such as a target accent identifier and original speaker's embeddings (e.g., the speaker's phonetic, prosodic, and/or other speaker-specific information.). Besides outputting the sequence of words or phonemes, the decoder module may also provide additional information including characteristics of the audio data (e.g., pitch, energy, or the like) and/or a predicted spectrogram based on the target accent. These outputs (including the sequence of words or phonemes and additional information generated) may assist the system and other modules in the system in predicting corresponding spectral acoustic features during an accent-based synthesis process.

Additionally, the example enhanced accent conversion system may include a voice encoder (vocoder) module that synthesizes audio signals with the target accent. The vocoder module may take the predicted spectrogram as an input and provide a synthesized version of the audio data with the target accent. In some examples, the vocoder module may comprise a Generative Adversarial Network (GAN) (e.g., a High-Fidelity Generative Adversarial Network (HiFi-GAN)) configured to generate high-quality audio signals. Other models such as harmonic models and overlap-add (OLA) models may also be used in the vocoder module.

The feature encoder module ensures that the representative features of the audio data are accent-neutral, and the influence of the accent-related content information is reduced or minimized. By feeding the accent-neutral features into the decoder portion of the ASR model and the utilizing of the voice encoder, the performance of the accent conversion system to provide more accurate and natural-sounding synthesized speech with a desired accent is enhanced and improved.

This illustrative example is given to introduce the reader to the general subject matter discussed herein and the disclosure is not limited to this example. The following sections describe various additional non-limiting examples and examples of enhanced accent conversion for virtual conferencing and audio recordings.

Referring now to FIG. 1, FIG. 1 shows an example system 100 that provides videoconferencing functionality to various client devices. The system 100 includes a chat and video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a chat and video conference provider 110 may supply components to enable a private organization to host private internal video conferences or to connect its system to the chat and video conference provider 110 over a public network.

The system optionally also includes one or more authentication and authorization providers, e.g., authentication and authorization provider 115, which can provide authentication and authorization services to users of the client devices 140-160. Authentication and authorization provider 115 may authenticate users to the chat and video conference provider 110 and manage user authorization for the various services provided by chat and video conference provider 110. In this example, the authentication and authorization provider 115 is operated by a different entity than the chat and video conference provider 110, though in some examples, they may be the same entity.

Figure 2:
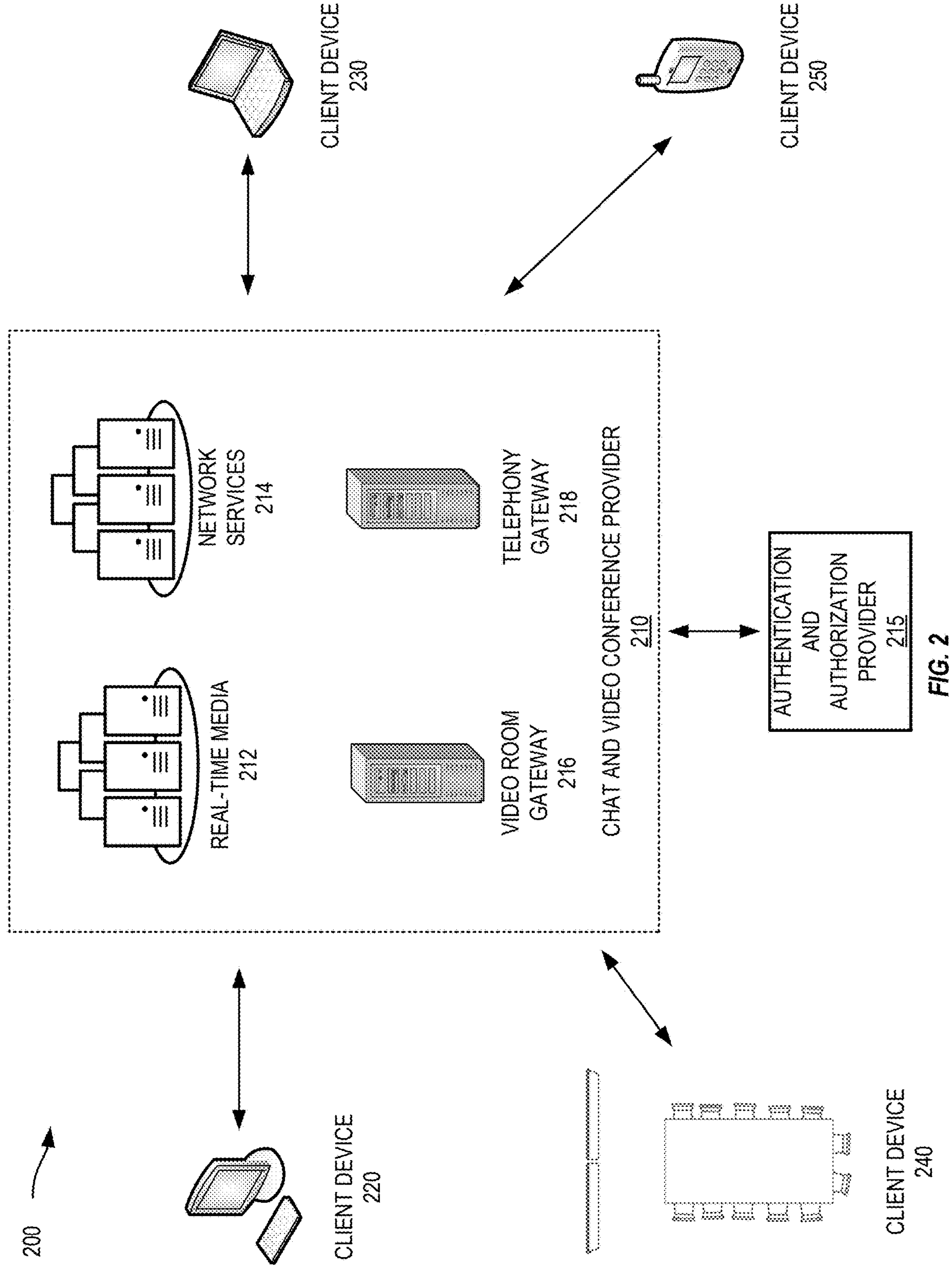
FIG. 2 shows an example system in which a chat and video conference provider provides videoconferencing and chat functionality to various client device.

Chat and video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example chat and video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user authentication information, meeting identifiers, meeting passwords or passcodes, etc. In examples that employ an authentication and authorization provider 115, a client device, e.g., client devices 140-160, may operate in conjunction with an authentication and authorization provider 115 to provide authentication and authorization information or other user information to the chat and video conference provider 110.

An authentication and authorization provider 115 may be any entity trusted by the chat and video conference provider 110 that can help authenticate a user to the chat and video conference provider 110 and authorize the user to access the services provided by the chat and video conference provider 110. For example, a trusted entity may be a server operated by a business or other organization with whom the user has created an account, including authentication and authorization information, such as an employer or trusted third-party. The user may sign into the authentication and authorization provider 115, such as by providing a username and password, to access their account information at the authentication and authorization provider 115. The account information includes information established and maintained at the authentication and authorization provider 115 that can be used to authenticate and facilitate authorization for a particular user, irrespective of the client device they may be using. An example of account information may be an email account established at the authentication and authorization provider 115 by the user and secured by a password or additional security features, such as single sign-on, hardware tokens, two-factor authentication, etc. However, such account information may be distinct from functionality such as email. For example, a health care provider may establish accounts for its patients. And while the related account information may have associated email accounts, the account information is distinct from those email accounts.

Thus, a user's account information relates to a secure, verified set of information that can be used to authenticate and provide authorization services for a particular user and should be accessible only by that user. By properly authenticating, the associated user may then verify themselves to other computing devices or services, such as the chat and video conference provider 110. The authentication and authorization provider 115 may require the explicit consent of the user before allowing the chat and video conference provider 110 to access the user's account information for authentication and authorization purposes.

Once the user is authenticated, the authentication and authorization provider 115 may provide the chat and video conference provider 110 with information about services the user is authorized to access. For instance, the authentication and authorization provider 115 may store information about user roles associated with the user. The user roles may include collections of services provided by the chat and video conference provider 110 that users assigned to those user roles are authorized to use. Alternatively, more or less granular approaches to user authorization may be used.

When the user accesses the chat and video conference provider 110 using a client device, the chat and video conference provider 110 communicates with the authentication and authorization provider 115 using information provided by the user to verify the user's account information. For example, the user may provide a username or cryptographic signature associated with an authentication and authorization provider 115. The authentication and authorization provider 115 then either confirms the information presented by the user or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide authentication information to authenticate the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide account information to the chat and video conference provider 110, even in cases where the user could authenticate and employs a client device capable of authenticating the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to chat and video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a chat and video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices. etc.

Referring now to FIG. 2, FIG. 2 shows an example system 200 in which a chat and video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more authentication and authorization providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local real-time media servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting an authentication and authorization provider 215 to verify the provided credentials. Once the user's credentials have been accepted, and the user has consented, the network services servers 214 may perform administrative functionality, like updating user account information, if the user has account information stored with the chat and video conference provider 210, or scheduling a new meeting, by interacting with the network services servers 214. Authentication and authorization provider 215 may be used to determine which administrative functionality a given user may access according to assigned roles, permissions, groups, etc.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may select a user to remove and issue a command through a user interface on their client device. The command may be sent to a network services server 214, which may then disconnect the selected user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real-time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3A:
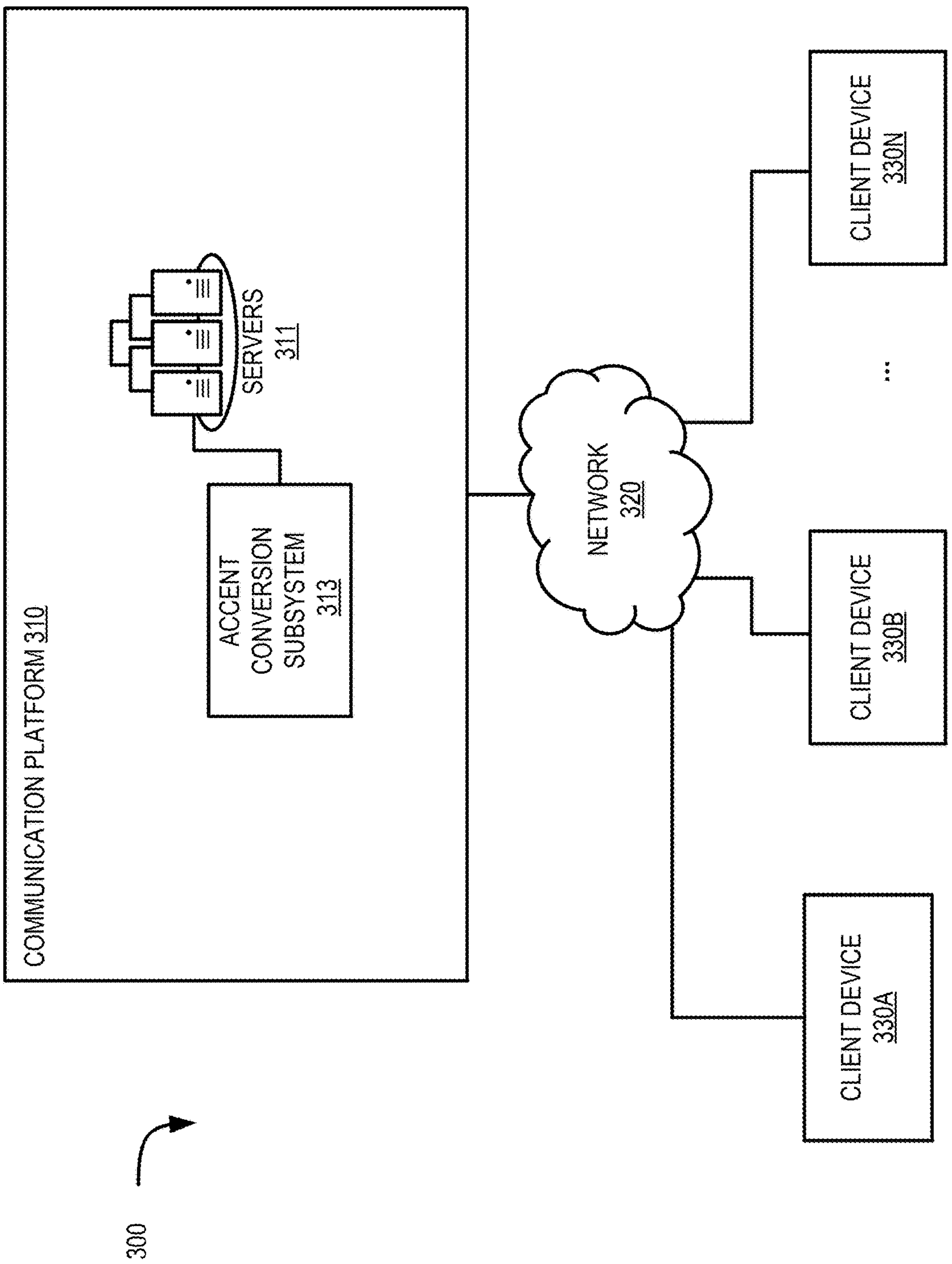
FIG. 3A shows an example system that can establish a virtual communication session for enhanced accent conversion.
Figure 3B:
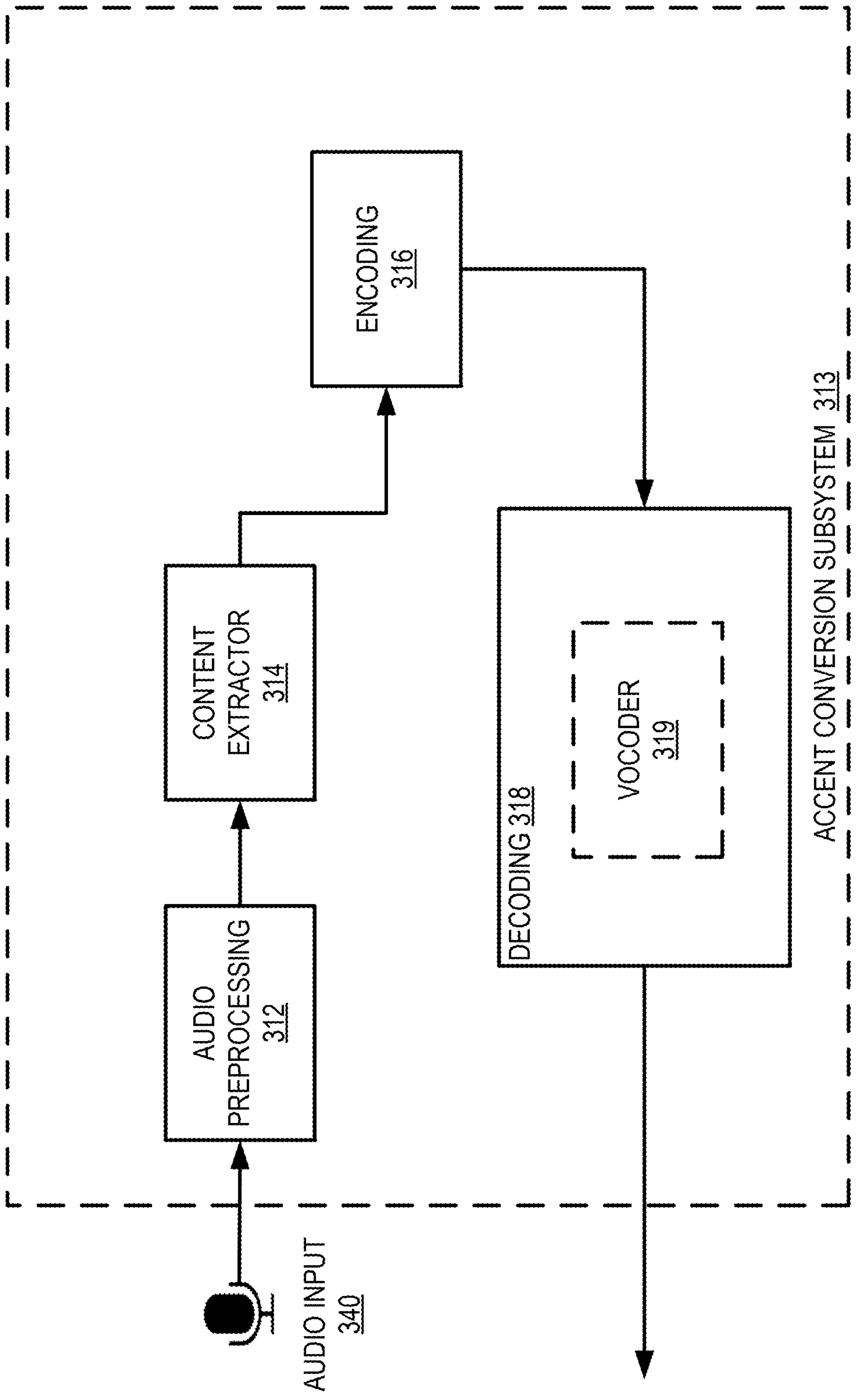
FIG. 3B shows an example accent conversion subsystem for virtual conferencing and audio recordings.

Referring now to FIGS. 3A-3B, FIG. 3A shows an example system 300 that can establish a virtual communication session for enhanced accent conversion. In this example system 300, a communication platform 310 and a number of client device 330A-330N (which may be referred to herein individually as a client device 330 or collectively as the client devices 330) are connected via a network 320. The communication platform 310 can be the chat and video conference provider 110 in FIG. 1 or the chat and video conference provider 210 in FIG. 2. The communication platform 310 may comprise a number of servers 311 and an accent conversion subsystem 313. The servers 311 may be the one or more servers employed by the video conference provider 210 in FIG. 2. The accent conversion subsystem 313 may be deployed to perform enhanced accent conversion (see FIG. 3B). The network 320 can be the internet or any suitable communications network or combination of communications network may be employed, including LANs (e.g., within a corporate private LAN), WANs, MANs, cellular network (e.g., 3G, 4G, 4G LTE, 5G, etc.), or any combination of these.

The client devices 330 can be any suitable computing or communications device. The client device 330 can be a client device (e.g., 140, 150, 160, or 170) in FIG. 1 or a client device (e.g., 220, 230, or 250) in FIG. 2. For example, client devices 330 may be desktop computers, laptop computers, tablets, smart phones having processors and computer-readable media, connected to the communication platform 310 using the internet or other suitable computer network. The client devices 330 have communication software installed to enable them to connect to the communication platform 310 for chats, video conferences, emails, and any other suitable communications. For example, during a chat session, a user associated a client device (e.g., client device 330A) can interact with other users associated with other client devices (e.g., client device 330B-330N) via the communication platform 310 by sending and receiving chat messages, and reacting to received chat messages.

Referring now to FIG. 3B, FIG. 3B shows an example accent conversion subsystem 313 for virtual conferencing and audio recordings. Audio input 340 may be accessed and preprocessed by an audio preprocessing module 312 of the accent conversion subsystem 313. The audio input 340 may be accessed through one or more of the servers 311 in FIG. 3A, or via the network 320 from the client devices 330 in FIG. 3A. The audio input 340 may be accessed and preprocessed by the audio preprocessing module 312 in real time. In some examples, the audio input 340 can be an audio recording uploaded through one of the client devices 330. In some examples, the audio preprocessing module 312 converts audio input (e.g., time-domain audio signals) into a spectrogram. The audio preprocessing module 312 may divide the time-domain audio signals into frames and transform each frame into a frequency-domain representation of a spectrogram. The audio preprocessing module 312 may also extract features such as MFCCs from the spectrograms.

The preprocessed audio data is then processed by the content extractor module 314 to generate content features. The content extractor module 314 may utilize a machine learning model or a neural network (e.g., a transformer model). For example, the content extractor module may use an encoder portion of an ASR model to extract the content features from the preprocessed audio data. In some examples, the encoder portion is a pretrained BERT model or a HuBERT model. In some examples, the content extractor module utilizes HMMs to extract the content features. In some examples, the content extractor module utilizes a hybrid model that is a combination of different types of encoders, such as a combination of CNNs and RNNs to capture both local and long-range dependencies in the preprocessed audio data to generate the content features.

The content features are input into an encoding module 316 to generate accent-neutral features. The encoding module 316 is configured to generate accent-neutral features from the content features using a pretrained feature encoder. The feature encoder is trained to extract accent-neutral features from the content features using a text-based approach. For example, the feature encoder may be trained using a set of training data comprising paired-up content features extracted from input audio and associated text information corresponding to the original speech of the input audio. The feature encoder may generate accent-neutral features using language-based models and/or neural networks. To ensure that the generated features are effectively accent-neutral, a supervised approach may be introduced and deployed using dynamic programming. In some examples, the text information is encoded using a text encoder to generate text features. By employing the dynamic programming, the text features may be aligned with the generated accent-neutral features to calculate a text loss. The alignment process can provide information about a pronunciation duration for each phoneme of the speech of the input audio. In some examples, the text features may be upsampled before calculating the text loss. The upsampling may be performed based on a total number of the corresponding generated accent-neutral features. The feature encoder may be further optimized based on the alignment and the text loss.

The accent-neutral features are input into a decoding module 318 to generate audio output. The decoding module 318 converts the accent-neutral features that are representative of the input audio into a sequence of words or phonemes. The decoding module 318 may comprise a decoder portion of an ASR model. The decoder module may be also configured to receive additional information such as a target accent identifier and original speaker's embeddings (e.g., the speaker's phonetic, prosodic, and/or other speaker-specific information.). Besides outputting the sequence of words or phonemes, the decoder module may also provide additional information including characteristics of the audio data (e.g., pitch, energy, or the like) and/or a predicted spectrogram based on the target accent. In some examples, the decoding module 318 may include a vocoder 319 that synthesizes audio signals with the target accent. The vocoder 319 may take the predicted spectrogram as an input and provide a synthesized version of the audio data with the target accent. In some examples, the vocoder 319 may comprise a GAN or a HiFi-GAN configured to generate high-quality audio signals. Other models such as harmonic models and OLA models may also be used in the vocoder module. The audio output is then sent to the servers 311 or to the client devices 330 via the network 320 in FIG. 3.

Figure 4:
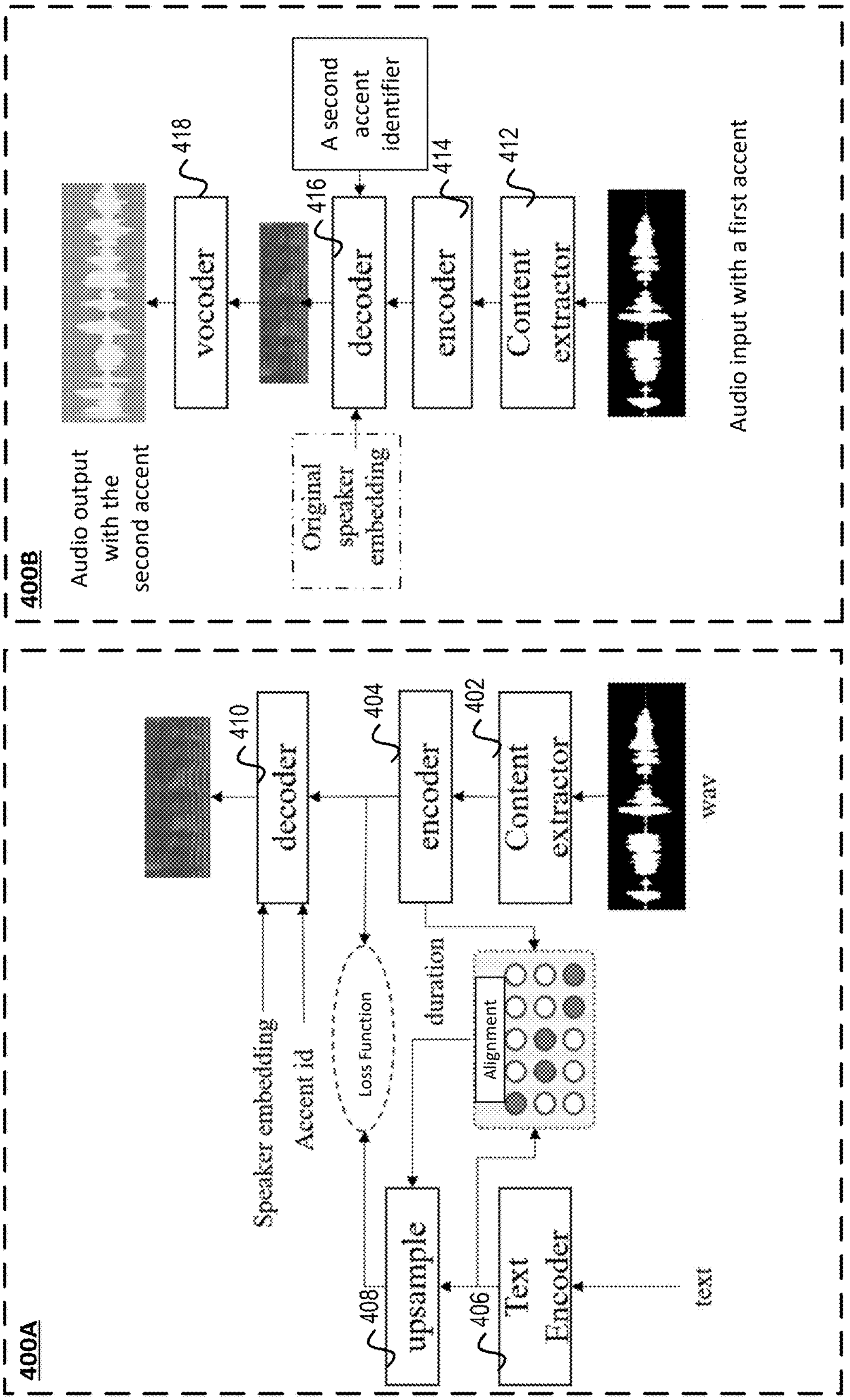
FIG. 4 shows an example system of training an encoder for enhanced accent conversion, and an example system of deploying the enhanced accent conversion using the trained encoder.

Referring now to FIG. 4, FIG. 4 shows an example system 400A of training an encoder for enhanced accent conversion, and an example system 400B of deploying the enhanced accent conversion using the trained encoder.

System 400A comprises a content extractor module 402, an encoder module 404, a text encoder module 406, an upsampling module 408, and a decoder module 410. To train the encoder module 404, system 400A begins with accessing training data. The training data includes audio files and corresponding text files. In some examples, the audio files are WAV files as shown in FIG. 4. In some examples, the audio files are preprocessed audio input, such as spectrums of speech in the audio files, or speech segments (e.g., frames). The corresponding text files comprises text information of speech in the audio files. The content extractor module 402 is configured to extract content features from input (e.g., original audio files or preprocessed audio input). The content extractor module 402 may also be configured to take a batch of audio files as input and extract a batch of content features from the batch of audio files. In some examples, the content extractor module 402 is a pretrained machine learning model (e.g., a Hidden Markov Model (HMM) or an HMM-based model). In some examples, the content extractor module 402 is a pretrained neural network (e.g., RNN, DNN, or HuBurt model). In some examples, the content extractor module 402 is an encoder part of an ASR model. The audio files may be the audio files accessed at block 602 of FIG. 6 and the content extractor module 402 may be configured to perform the process at block 604 of FIG. 6. In some examples, the audio files are the audio input 340 or the preprocessed audio input generated by the audio preprocessing block 312 described with respect to FIG. 3B, and the content extractor module is the content extractor 314 described with respect to FIG. 3B.

The encoder module 404 converts content features to accent-neutral features. One purpose of the system 400A is to train and optimize an encoder model of the encoder module 404, so that the trained encoder model can generate features that are accent neutral and can be implemented in the encoder module 414 of system 400B. To ensure that the generated features are accent neutral, the speech in the audio input of the training data are speech with the same desired accent (e.g., an American accent, a British accent). In some examples, different sets of training data with different accents may be used to train different encoders in the encoder module.

Figure 6:
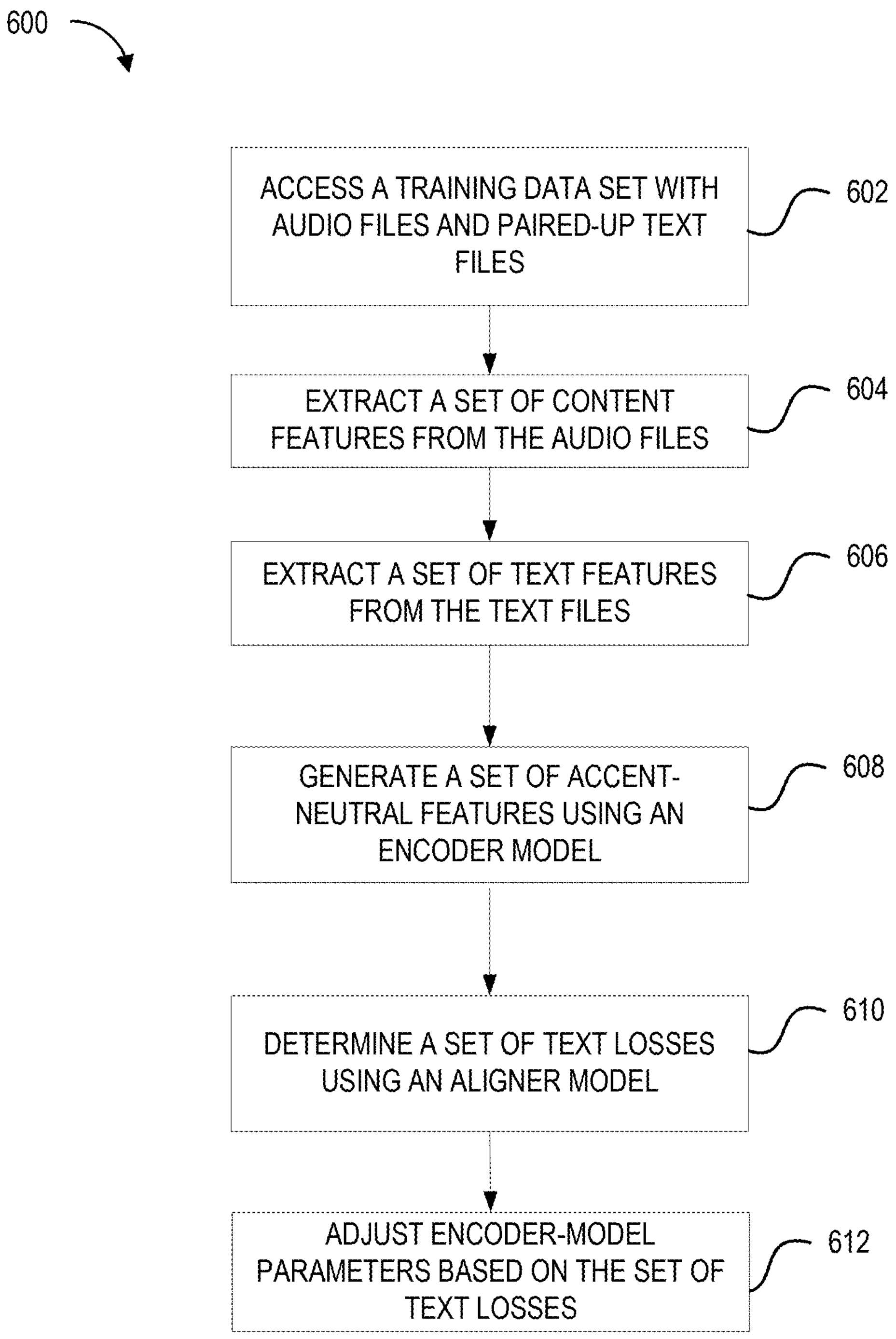
FIG. 6 shows an example training process for enhanced accent conversion for virtual conferencing and audio recordings.

The encoder module 404 may be configured to perform the process at block 608 of FIG. 6. In some examples, the pretrained encoder model is a neural network with predetermined network architecture. For example, the pretrained encoder model can be structured with a 3-layer transformer, where each transformer layer consists of 256 hidden layer nodes. Parameters of the encoder model (e.g., weights, biases) will be estimated or updated in the training process. In some examples, parameters in the content extractor module 402 are also updated in the training process.

The text encoder module 406 is configured to extract text features from text input. The text encoder module 406 may also be configured to take a batch of text files as input and extract a batch of text features from the batch of text files. In some examples, the text encoder module 406 comprises a machine learning model to perform the extraction. When training the system 400A, the machine learning model of the text encoder module 406 can also be trained and parameters of the machine learning model of the text encoder module 406 can also be updated, so that the performance of the trained encoder model in the encoder module 404 is not impeded by the performance of the machine learning model of the text encoder module 406. The text files may be the text files accessed at block 602 of FIG. 6 and the text encoder module 406 may be configured to perform the process at block 606 of FIG. 6.

The upsampling module 408 upsamples the text features based on an alignment of the extracted text features generated by the text encoder module 406 with corresponding extracted accent-neutral features generated by the encoder module 404. As shown in FIG. 4, the alignment may provide duration information (e.g., information about a pronunciation duration for each phoneme). The upsampling may be performed based on the alignment so that a loss function can be utilized to determine a text loss between the text features with corresponding accent-neutral features. The upsampling module 408 may be configured to perform a part of the process at block 610 of FIG. 6.

The text loss (or a batch of text losses) may be determined based on the loss function and used to decide whether to update model parameters of the encoder model of the encoder module 404, and/or to update parameter of the machine learning model of the text encoder module 406, or if an optimized condition of the encoder model and/or the machine learning model has been met. In response to a determination that the encoder model is optimized, the output of the encoder module 404 is transmitted to the decoder module 410 to evaluate the performance of the system 400A. The evaluation may be an objective evaluation based on an evaluation of the output of the decoder module 410. For example, the evaluation may be based on the accuracy of text information provided by the decoder module 410 by comparing with the ground truth text information provided in the training data set. The evaluation may also be a subjective evaluation based on the scoring of synthesized audio output provided by or based on the decoder module 410. The scoring may be provided by a group of evaluators.

In some examples, a spectrum loss is computed based on the difference between the output spectrum (e.g., a Mel spectrum or other spectrogram) by the decoder module 410 and the spectrum corresponding to the original audio input. The spectrum loss can be a desired criterion to evaluate the performance of the training since the input audio has the same accent with the output audio (controlled by the decoder module 410 and the accent identifier). A desired loss may be predetermined and compared to the computed spectrum loss. If the computed spectrum loss is greater than or falls outside of the desired loss, the training of the encoder model of the encoder module 404 and/or the machine learning model of the text encoder module 406 will be continued and the model parameters are subsequently updated. In some examples, the computed spectrum loss may trigger a change of hyperparameters of the encoder model of the encoder module 404 and/or the machine learning model of the text encoder module 406, or a change of the model used in the content extractor module 402. In some examples, whether to continue the training process is determined by determining a change of the computed spectrum loss in two training iterations. After a desired state (e.g., an optimal text loss or spectrum loss) is met, the encoder model of the encoder module 404 can be output and provided to the system 400B.

System 400B comprises a content extractor module 412, an encoder module 414, a decoder module 416, and a vocoder module 418. The content extractor module 412 extracts content features from the audio input with a first accent. As shown in FIG. 4, the audio input may be a WAV file accessed at block 502 of FIG. 5 and the content extractor module 412 may be configured to perform the process at block 504 of FIG. 5. In some examples, the content extractor module 412 comprises the same model as that in the content extract module 402 of system 400A.

The encoder module 414 comprises an encoder model trained by the system 400A. The encoder module 414 converts content features to accent-neutral features. In some examples, the encoder module 414 comprises multiple trained encoder models, with each encoder model corresponds to a different desired accent. The encoder module 414 may be configured to perform the process at block 506 of FIG. 5.

The decoder module 416 takes the accent-neutral features and a second accent identifier as input and generate output data such as a predicted spectrogram to be input into the vocoder module 418 and generate a final audio output with the second accent. The decoder module 416 may also take additional information such as original speaker's embedding to improve the audio output. In some examples, the decoder module 416 is configured as the same decoder module 410 of system 400A. The decoder module 416 may be worked together with the vocoder module 418 to perform the process at block 508 of FIG. 5.

Figure 5:
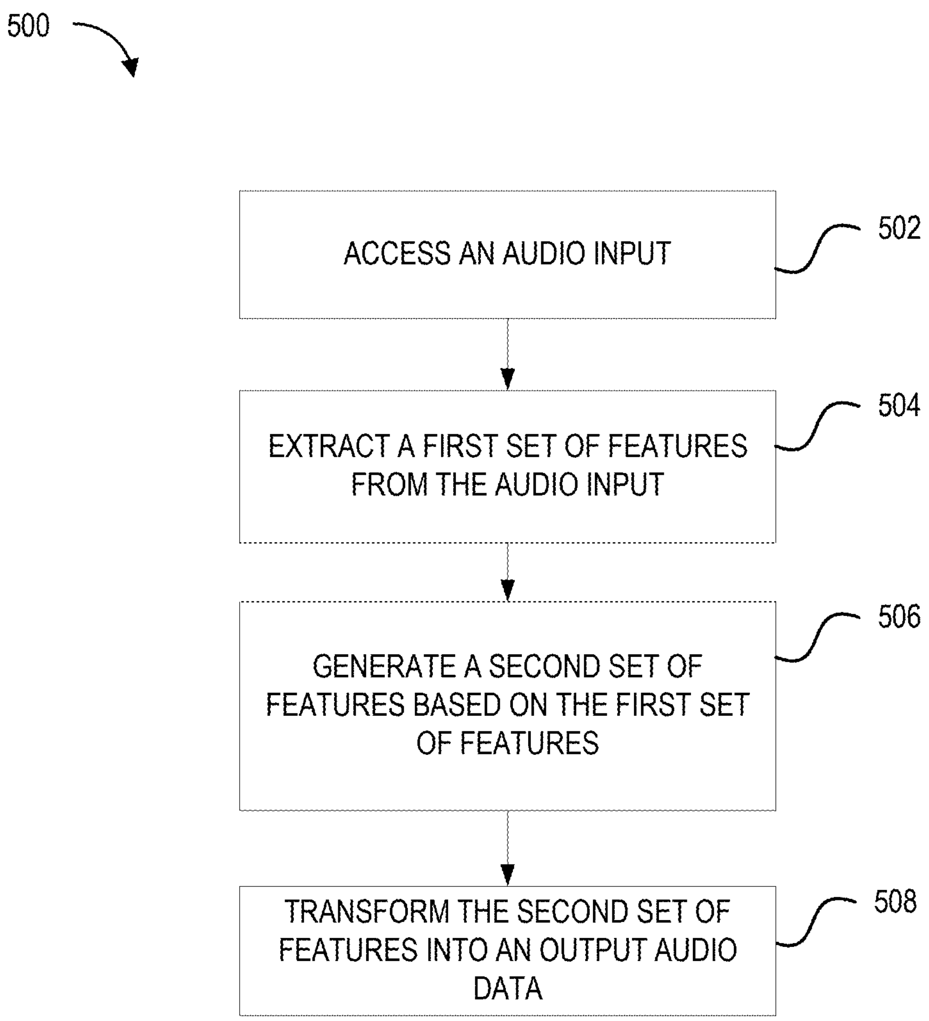
FIG. 5 shows an example process for enhanced accent conversion for virtual conferencing and audio recordings.

Referring now to FIG. 5, FIG. 5 shows an example process 500 for enhanced accent conversion for virtual conferencing and audio recordings. The process 500 is directed to converting and synthesizing audio signals with desired accent.

At block 502, an audio input is accessed. The audio input may be an analog audio input or a digital audio input. The audio input may be captured using a microphone or a Bluetooth-enabled device. The audio input may be generated as a part of video conferencing, or pre-captured and stored as an audio recording. The audio input may come from an audio file or a video file that is temporarily stored in a local computer memory or stored remotely in a cloud or a server. The audio input may comprise audiovisual content. The audio input may also comprise metadata such as timestamps, participant information, accent information, and the like.

In some instances, the audio input comprises specific characteristics of an audio signal such as its sampling rate, bit depth, encoding format, number of channels, and the like. In some instances, the audio input accessed comprises a spectrogram or a sequence of acoustic features extracted from an audio signal. The audio input may be accessed by preprocessing the audio signal. The preprocessing may include steps of sampling, normalizing, segmenting, feature extracting, and/or encoding.

The sampling step may convert continuous analog audio signal into discrete digital signals by measuring an amplitude of the analog audio signal at regular intervals of time. This is done to create a digital representation of the analog audio signal that can be processed, stored, and transmitted by computing systems. A sampling rate or a limit (an upper limit or a lower limit) may be predetermined based on technical needs. For example, an upper limit of 8 kHz may be used to limit that at most 8,000 samples are taken per second to represent the analog audio signal; however, any suitable sampling rate may be employed, e.g., from 4 kHz up to 44.1 kHz or greater. The normalizing step scales the audio signal to a standard amplitude range to ensure consistent input levels.

The segmenting step divide the audio signal into smaller segments, such as frames, that can be fed into an ASR model for processing and further analysis. Segmenting can be done using various techniques, such as using a fixed-size window to slide over the audio signal and extract segments of a certain time-duration. Each segment or frame may be about 10-30 milliseconds (ms) long. The choice of frame length is often a trade-off between time resolution and frequency resolution. A shorter frame length provides better time resolution, allowing for more precise analysis of transient sounds and rapid changes in the audio signal. On the other hand, a longer frame length provides better frequency resolution, allowing for more accurate analysis of the frequency content of the signal. A frame length may be 20 ms that is long enough to capture characteristics of individual speech sounds (i.e., phonemes) while still providing reasonable frequency resolution for analysis. These frames are often overlapped to ensure continuity and capture transitions between frames, though overlapping frames is not necessary.

The feature extracting step may extract acoustic features from the audio signal, such as Mel-frequency cepstral coefficients (MFCCs) or spectrogram representations, which can be used as input features for the ASR model. The encoding step converts the audio signal into a digital format, such as Pulse Code Modulation (PCM), which is suitable for processing by the ASR model.

At block 504, a first set of features are extracted from the audio input. The extraction may be performed using a content extractor. The content extractor can be an encoder portion of an ASR model. The encoder may be an acoustic encoder, a deep neural network (DNN) encoder, a convolutional neural network (CNN) encoder, a recurrent neural network (RNN) encoder, a transformer encoder, or the like. In some instances, the content extractor comprises a pretrained HuBERT model. In some instances, a hidden Markov model (HMM) may be used as part of the encoder to model the audio input. The first set of features may be content features and/or may comprise one or more of the following features: MFCCs, filterbanks, spectrogram-related features (e.g., spectral centroid and flux), linear predictive coding (LPC) coefficients, perceptual linear prediction (PLP) coefficients, harmonic-to-noise ratio (HNR), phonetic posteriorgrams (PPGs), pitch, energy, and other voicing or rhythm features. In some examples, the number of features extracted depends on the number of segments or frames of the audio input, and the ASR model (or other machine learning models) used to extract the features. For example, a 1-second audio input may comprise 100 frames, with 256 or 512 features extracted from each frame.

At block 506, a second set of features are generated based on the first set of features extracted at block 504. The second set of features may be generated using a pretrained encoder that is configured to minimize accent-related influence and generate accent-neutral features from a set of content features. The encoder may be configured based on a process 600 of FIG. 6. In some examples, the number of features generated at block 506 is less than the number of features extracted at block 504, with each feature different from any features extracted at block 504. In some examples, the number of features generated at block 506 depends on the number of segments or frames of the audio input and the configuration of the encoder. For example, 100×80 features may be generated for a 1-second audio input comprising 100 frames.

At block 508, the second set of features is transformed into an output audio data. The transformation may comprise two stages: at stage one, the second set of features may be input into a decoder portion of the ASR model to generate a predicted spectrogram; and at stage two, the predicted spectrogram maybe input into a voice encoder (vocoder) to synthesize an audio output with a desired accent. The decoder may be configured to convert features into a sequence of words or phonemes. The decoder may use a language model to predict probabilities of different word or phoneme sequences. The algorithm used by the decoder may comprises greedy search, beam search, finite state transducer (FST), N-gram language model, and/or connectionist temporal classification (CTC). The decoder may be an acoustic decoder, a DNN decoder, a CNN decoder, an RNN decoder, a transformer decoder, or the like. The decoder may be further configured to receive information such as a desired accent identifier and/or a speaker embedding. The speaker embedding may be the embedding of the original speaker of the audio input accessed at block 502. The embedding of the original speaker may be learned using a neural network-based model from the audio input. The neural network-based model may be the same model of the encoder at block 504 or the encoder at block 506. The speaker embedding may also be a desired speaker embedding (e.g., a standardized embedding with the desired accent) that is predetermined based on system or user needs. The decoder may be further configured to generate a predicted spectrogram based on the output sequence of words or phonemes and the received information (e.g., the desired accent identifier and/or the speaker embedding).

The vocoder at stage two may be configured to analyze and synthesize a human voice. The predicted spectrogram or associated spectral information may be input into the vocoder to modulate and synthesize an audio output.

The vocoder may adopt a Generative Adversarial Network (GAN) (e.g., a High-Fidelity Generative Adversarial Network (HiFi-GAN)) architecture that is configured to generate high-quality audio signals. The vocoder may also be a linear predictive coding (LPC) vocoder, a harmonic vocoder, a formant vocoder, or a hybrid thereof. The output audio may be provided to a user (e.g., a user of a video-conferencing meeting) in real time when the user receives the audio input or hear the audio input with a reasonable delay (e.g., a delay of about 200 ms—3 seconds). In some instances, the output audio is provided asynchronously (e.g., when the audio input is from an audio recording).

Referring now to FIG. 6, FIG. 6 shows an example training process 600 for enhanced accent conversion for virtual conferencing and audio recordings. The process 600 is directed to training an encoder to extract accent-neutral features that can be used for enhanced accent conversion.

At block 602, a training data set with audio files and paired-up text files is accessed. Each of the audio files has a paired-up text file. The audio files may be Waveform Audio File Format (WAV or way) files or MPEG-1 Audio Layer 3 (MP3) files and may comprise audio data in a same format and/or comprise same features or characteristics as the audio input accessed at block 502 of FIG. 5. For example, the audio data may be an analog audio input or a digital audio input. The audio input may be captured using a microphone or a Bluetooth-enabled device. The audio input may also comprise metadata such as timestamps, participant information, accent information, and the like. In some instances, the audio files comprise specific characteristics of audio signals. In some instances, the audio files comprise spectrograms or sequences of acoustic features extracted from audio signals. The training audio files may be accessed through a publicly available database (e.g., Freesound, AudioSet, Linguistic Data Consortium (LDC), or the like) or through a commercial database. The text files associated with the audio files may be accessed together through the same database, generated using a computing algorithm, or manually annotated. In some instances, the training data set is a diverse dataset that comprises speech samples with various accents. It is also possible that the training data set contains speech samples with a single accent.

At block 604, a set of content features may be extracted from the audio files using a content extractor. The content extractor may be configured based on a pretrained speech model (e.g., HuBERT model or an ASR model). The content extractor may be the same content extractor used at block 504 of FIG. 5. For example, the content extractor may be the encoder portion of the same ASR model used at block 504. In some instances, the content extractor may be an encoder portion of a different ASR model comparing to the ASR model used at block 504. An example content extractor is a 3-layer transformer with each layer consisting of 256 hidden layer nodes. The number of layers and the number of nodes may be predetermined based on training or system needs.

At block 606, a set of text features may be extracted from the text files using a text extractor. The text extractor may be a machine learning model or a deep learning model that is configured to extract text features by breaking text into elements and extracting elements that are representative. For example, the extracted elements may be the top k elements selected based on a frequency or a term frequency-inverse document frequency (TF-IDF) score. In some instances, the text extractor is configured based on a natural language processing (NLP) model. An example text extractor is a 3-layer transformer with each layer consisting of 256 hidden layer nodes.

At block 608, a set of accent-neutral features is generated using an encoder model. The encoder model is the model to be trained in the training process 600. The encoder model may be a machine learning model or a deep learning model (e.g., DNN, CNN, or RNN) that is configured to generate accent-neutral features from a set of input features. An example encoder model is a 3-layer transformer with each layer consisting of 256 hidden layer nodes.

At block 610, the accent-neutral features generated at block 608 may be aligned with the text features extracted at block 606 using an aligner model to determine a text loss. The text loss is used to evaluate the performance of the encoder model at block 608. The aligner model may be a sequence-based alignment model. For example, an aligner model may be a model based on a monotonic alignment search (MAS) to find a best matching alignment between elements of two sequences while preserving the temporal order of the elements. The aligner model may be a MAS-like model that also enforces a monotonic alignment between sequences such as a Hidden Markov model (HMM) with monotonic constraints. The aligner model may be a neural network also adopts an attention mechanism. The alignment may be employed using a dynamic programming technique and aimed to provide information such as the pronunciation duration for each phoneme.

In some instances, the text features are upsampled based on the alignment. The total number of text features may be smaller than the total number of accent-neutral features, so that an upsampling process may be performed to align features in the text domain with those in the speech domain. A text loss may be determined after the upsampling. The text loss may be determined based on the upsampled text features and the accent-neutral features based on a loss function. The goal of training the encoder model is to minimize this loss function, which means making the text predictions as close as possible to the actual text. Different loss functions may be implemented, for example, based on a mean squared error (MSE), an entropy (e.g., categorical cross-entropy or sparse categorical cross-entropy), or a hinge loss.

Optionally, the accent-neutral features generated at block 608 are input into a decoder to generate a predicted spectrogram. The decoder may be the same decoder used at block 508 of FIG. 5. The predicted spectrogram may be compared with the original spectrogram in the audio files accessed at block 602 to calculate a spectrum loss (or a set of spectrum losses). The goal of training the encoder model may also comprise minimizing this spectrum loss (or a difference of the spectrum losses between iterations does not exceed a predetermined criterion).

At block 612, parameters of the encoder model are adjusted based on the set of text losses and/or spectrum losses. The set of text losses and/or the spectrum losses are employed as an evaluation of the performance of the encoder model on whether accent-neutral features are effectively extracted. A condition may be predetermined regarding whether an optimal stage of the encoder model has been achieved. In some instances, once the encoder model is determined to be optimized, a set of accent-neutral features of each audio file is send to a decoder and optionally a vocoder to evaluate the performance of the trained encoder model. In some examples, the evaluation is used to determine whether to adjust hyperparameters of the encoder model. The decoder may be the same decoder used at block 508 of FIG. 5 and the vocoder may also be the same vocoder used at block 508. In some instances, the decoder or the vocoder may be different from those used at block 508 of FIG. 5.

Figure 7:
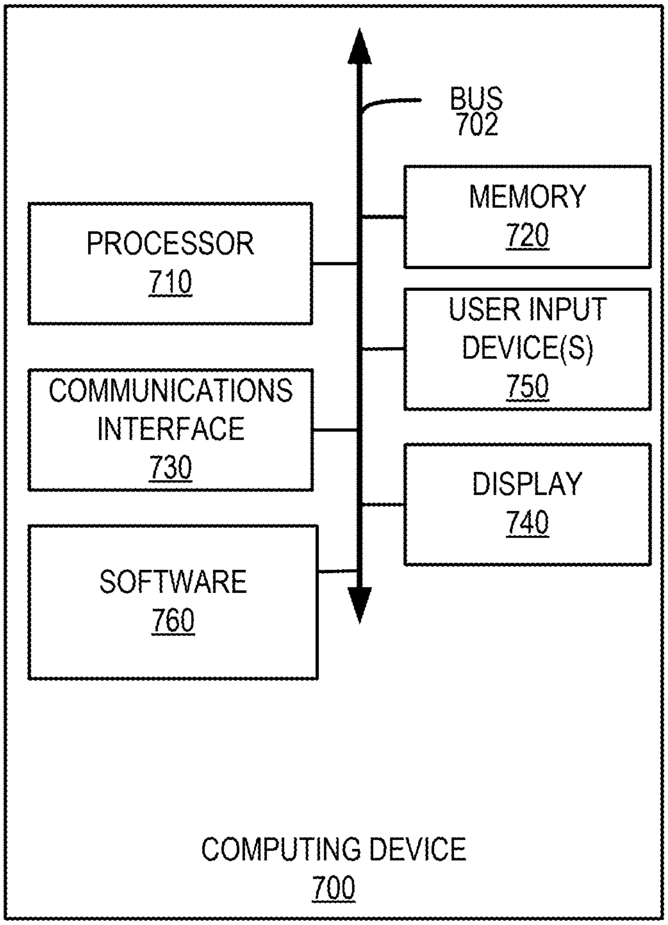
FIG. 7 shows an example computing device suitable for use in example systems or methods for enhanced accent conversion for virtual conferencing and audio recordings, according to certain examples.

Now referring to FIG. 7, FIG. 7 shows an example computing device 700 suitable for use in example systems or methods for enhanced accent conversion for virtual conferencing and audio recordings. The example computing device 700 includes a processor 710 which is in communication with the memory 720 and other components of the computing device 700 using one or more communications buses 702. The processor 710 is configured to execute processor-executable instructions stored in the memory 720 to perform one or more methods for enhanced accent conversion, such as part or all of the example processes 500 or 600, described above with respect to FIGS. 5 and 6, or part or all of the example systems 400A or 400B, described above with respect to FIG. 4. The computing device, in this example, also includes one or more user input devices 750, such as a keyboard, mouse, touchscreen, video input device (e.g., one or more cameras), microphone, etc., to accept user input. The computing device 700 also includes a display 740 to provide visual output to a user. The computing device 700 may also include a software 760. The software 760 may include a communication application (client application), a communication platform, and any other software to enable communication from a first user to a second user.

The computing device 700 also includes a communications interface 730. In some examples, the communications interface 730 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

What is claimed is:

1. A computer-implemented method comprising:

accessing an audio input, the audio input comprising speech having a first accent;

extracting, using a first neural network, a first set of features from the audio input wherein the first set of features comprises content features associated with the speech;

determining a second set of features using a second neural network based on the first set of features, wherein the second neural network was trained by a training process comprising aligning text features extracted from training text files with accent-neutral features generated by the second neural network from corresponding training audio files, upsampling the text features based on the alignment, and determining text losses based on a comparison between the upsampled text features and the accent-neutral features, wherein model parameters of the second neural network were adjusted based on the text losses; and generating output audio data using a decoder based on the second set of features and a designated accent identifier, the output audio data comprising speech having a second accent different from the first accent.

2. The computer-implemented method of claim 1, further comprising training the second neural network by the training process, wherein the training comprises:

(i) accessing a training data set, wherein the training data set comprises a set of audio files and a set of text files, wherein each audio file in the set of audio files has a corresponding text file in the set of text files;

(ii) extracting a set of content features from each audio file using a content extractor model;

(iii) inputting the set of content features into the second neural network to generate a set of accent-neutral features;

(iv) extracting a set of text features from each text file using a text extractor model;

(v) inputting the set of accent-neutral features and the set of text features into an aligner model;

(vi) aligning text features with corresponding accent-neutral features for each pair of the audio file and the text file to determine a set of text losses;

(vii) adjusting the model parameters of the second neural network and/or the text extractor model based on the set of text losses;

(viii) iteratively performing steps (iii)-(viii) until a predetermined state is met; and (ix) outputting the second neural network.

3. The computer-implemented method of claim 2, wherein the content extractor model is the first neural network.

4. The computer-implemented method of claim 1, wherein the first neural network is a pretrained Automatic Speech Recognition (ASR) model or a pretrained Bidirectional Encoder Representations from Transformers (BERT) model.

5. The computer-implemented method of claim 1, further comprising:

extracting a set of speaker features from the audio input; and synthesizing audio signals using a vocoder based on the output audio data, wherein the generating the output audio data is further based on the set of speaker features.

6. A system comprising:

a communications interface;

a non-transitory computer-readable medium; and one or more processors communicatively coupled to the communications interface and the non-transitory computer-readable medium, the one or more processors configured to execute processor-executable instructions stored in the non-transitory computer-readable medium to:

access an audio input, the audio input comprising speech having a first accent;

extract, using a first neural network, a first set of features from the audio input, wherein the first set of features comprises content features associated with the speech;

determine a second set of features using a second neural network based on the first set of features, wherein the second neural network was trained by a training process comprising aligning text features extracted from training text files with accent-neutral features generated by the second neural network from corresponding training audio files, upsampling the text features based on the alignment, and determining text losses based on a comparison between the upsampled text features and the accent-neutral features, wherein model parameters of the second neural network were adjusted based on the text losses; and generate output audio data using a decoder based on the second set of features and a designated accent identifier, the output audio data comprising speech having a second accent different from the first accent.

7. The system of claim 6, wherein the one or more processors are configured to execute further processor-executable instructions stored in the non-transitory computer-readable medium to:

(i) access a training data set, wherein the training data set comprises a set of audio files and a set of text files, wherein each audio file in the set of audio files has a corresponding text file in the set of text files;

(ii) extract a set of content features from each audio file using a content extractor model;

(iii) input the set of content features into the second neural network to generate a set of accent-neutral features (iv) extract a set of text features from each text file using a text extractor model;

(v) input the set of accent-neutral features and the set of text features into an aligner model;

(vi) align text features with corresponding accent-neutral features for each pair of the audio file and the text file to determine a set of text losses;

(vii) adjust the model parameters of the second neural network and/or the text extractor model based on the set of text losses;

(viii) iteratively perform steps (iii)-(vii) until a predetermined state is met; and (ix) output the second neural network.

8. The system of claim 7, wherein the content extractor model is the first neural network.

9. The system of claim 6, wherein the first neural network is a pretrained Automatic Speech Recognition (ASR) model or a pretrained Bidirectional Encoder Representations from Transformers (BERT) model.

10. The system of claim 6, wherein the one or more processors are configured to execute further processor-executable instructions stored in the non-transitory computer-readable medium to:

extract a set of speaker features from the audio input; and synthesize audio signals using a vocoder based on the output audio data, wherein the generating the output audio data is further based on the set of speaker features.

11. A non-transitory computer-readable medium comprising processor-executable instructions configured to cause one or more processors to:

access an audio input, the audio input comprising speech having a first accent;

extract, using a first neural network, a first set of features from the audio input, wherein the first set of features comprises content features associated with the speech;

determine a second set of features using a second neural network based on the first set of features, wherein the second neural network was trained by a training process comprising aligning text features extracted from training text files with accent-neutral features generated by the second neural network from corresponding training audio files, upsampling the text features based on the alignment, and determining text losses based on a comparison between the upsampled text features and the accent-neutral features, wherein model parameters of the second neural network were adjusted based on the text losses; and generate output audio data using a decoder based on the second set of features and a designated accent identifier, the output audio data comprising speech having a second accent different from the first accent.

12. The non-transitory computer-readable medium of claim 11, further comprising processor-executable instructions configured to cause one or more processors to:

(i) access a training data set, wherein the training data set comprises a set of audio files and a set of text files, wherein each audio file in the set of audio files has a corresponding text file in the set of text files;

(ii) extract a set of content features from each audio file using a content extractor model;

(iii) input the set of content features into the second neural network to generate a set of accent-neutral features (iv) extract a set of text features from each text file using a text extractor model;

(v) input the set of accent-neutral features and the set of text features into an aligner model;

(vi) align text features with corresponding accent-neutral features for each pair of the audio file and the text file to determine a set of text losses;

(vii) adjust the model parameters of the second neural network and/or the text extractor model based on the set of text losses;

(viii) iteratively perform steps (iii)-(vii) until a predetermined state is met; and (ix) output the second neural network.

13. The non-transitory computer-readable medium of claim 12, wherein the content extractor model is the first neural network.

14. The non-transitory computer-readable medium of claim 11, further comprising processor-executable instructions configured to cause one or more processors to:

extract a set of speaker features from the audio input; and synthesize audio signals using a vocoder based on the output audio data, wherein the generating the output audio data is further based on the set of speaker features.

* * * * *